US012748419B2

(12) United States Patent
Tanaka et al.

(10) Patent No.: US 12,748,419 B2
(45) Date of Patent: Sep. 29, 2026

(54) LIFE DETERMINING DEVICE AND LIFE DETERMINING METHOD

(71) Applicant: TOYOTA JIDOSHA KABUSHIKI KAISHA, Toyota (JP)

(72) Inventors: Shogo Tanaka, Okazaki (JP); Ryo Kanda, Nisshin (JP); Seiji Kanda, Miyoshi (JP); Ryoko Tanaka, Toyota (JP); Takuma Endo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 454 days.

(21) Appl. No.: 18/474,630

(22) Filed: Sep. 26, 2023

(65) Prior Publication Data

US 2024/0231354 A1 Jul. 11, 2024

(30) Foreign Application Priority Data

Dec. 15, 2022 (JP) ................................ 2022-200381

(51) Int. Cl.
*G05B 23/02* (2006.01)

(52) U.S. Cl.
CPC ....... *G05B 23/0283* (2013.01); *G05B 23/024* (2013.01)

(58) Field of Classification Search
CPC .......................... G05B 23/024; G05B 23/0283
See application file for complete search history.

(56) References Cited

U.S. PATENT DOCUMENTS

| | | | | |
|---|---|---|---|---|
| 2008/0131286 | A1* | 6/2008 | Koehl | F04B 49/10 417/12 |
| 2017/0151849 | A1 | 6/2017 | Ohashi et al. | |
| 2017/0274723 | A1* | 9/2017 | Tanaka | F15B 11/16 |

FOREIGN PATENT DOCUMENTS

| | | | |
|---|---|---|---|
| JP | H06-307348 | A | 11/1994 |
| JP | H07-248167 | A | 9/1995 |
| JP | 2017-095028 | A | 6/2017 |
| JP | 2017-118787 | A | 6/2017 |

* cited by examiner

*Primary Examiner* — Jennifer Bahls
(74) *Attorney, Agent, or Firm* — SoraIP, Inc.

(57) ABSTRACT

ECU is configured to determine a life of a brush motor that is a power source of the oil pump. ECU estimates the motor current of the brush motor based on the oil temperature and the hydraulic pressure. ECU measures the operation time of the brush motor at the estimated motor current. ECU determines the life of the brush motor based on the estimated motor current and the measured operation times.

6 Claims, 5 Drawing Sheets

42a

| | $T < Tta$ | $Tta \leq T < Ttb$ | $Ttb \leq T$ |
|---|---|---|---|
| $P < Pta$ | MCaa | MCab | MCac |
| $Pta \leq P < Ptb$ | MCba | MCbb | MCbc |
| $Ptb \leq P < Ptc$ | MCca | MCcb | MCcc |
| $Ptc \leq P$ | MCda | MCdb | MCdc |

FIG. 4

42b

| ESTIMATED MOTOR CURRENT | CUMULATIVE OPERATION TIME AT EACH MOTOR CURRENT |
|---|---|
| MCaa | OTaa |
| MCab | OTab |
| MCac | OTac |
| MCba | OTba |
| MCbb | OTbb |
| MCbc | OTbc |
| MCca | OTca |
| MCcb | OTcb |
| MCcc | OTcc |
| MCda | OTda |
| MCdb | OTdb |
| MCdc | OTdc |

LIFE DETERMINING DEVICE AND LIFE DETERMINING METHOD

CROSS-REFERENCE TO RELATED APPLICATION

This application claims priority to Japanese Patent Application No. 2022-200381 filed on Dec. 15, 2022, incorporated herein by reference in its entirety.

BACKGROUND

1. Technical Field

The present disclosure relates to a life determining device and a life determining method.

2. Description of Related Art

Conventionally, a life determining device for determining a life of a brush motor has been known (for example, refer to Japanese Unexamined Patent Application Publication No. 2017-118787 (JP 2017-118787 A)).

The life determining device is configured to determine the life of the brush motor based on a motor current.

SUMMARY

Here, in the above-described conventional life determining device, it is necessary to provide a current sensor for measuring a motor current.

The present disclosure has been made to solve the above issue, and an object of the present disclosure is to provide a life determining device and a life determining method capable of determining a life of a brush motor without providing the current sensor.

A life determining device according to the present disclosure determines a life of a brush motor that is a power source of a supply device for supplying a fluid. The life determining device includes a current estimating unit, an operation time measuring unit, and a life determining unit. The current estimating unit estimates a current of the brush motor based on a temperature of the fluid and a pressure of the fluid. The operation time measuring unit measures an operation time of the brush motor at the current estimated by the current estimating unit. The life determining unit determines the life of the brush motor based on the current estimated by the current estimating unit and the operation time measured by the operation time measuring unit.

As described above, the current of the brush motor is estimated based on the temperature of the fluid and the pressure of the fluid, so that the life of the brush motor can be determined without providing the current sensor.

The life determining device may include a storage unit storing a map for deriving a current using the temperature and the pressure as parameters. The current of the map may be set to be smaller as the temperature of the map increases, and the current of the map may be set to be larger as the pressure of the map increases. The current estimating unit may be configured to estimate the current of the brush motor using the map.

In the life determining device including the map, operation history information may be stored in the storage unit, and the operation time of the brush motor at each current of the map may be accumulated in the operation history information. The life determining unit may be configured to calculate a current squared time product by using the operation time at each current accumulated in the operation history information, and to determine that the brush motor has reached an end of the life when the current squared time product exceeds a threshold value.

In the life determining device, the supply device may be configured to supply the fluid to an actuator of a vehicle height adjustment system.

A life determining method according to the present disclosure determines a life of a brush motor that is a power source of a supply device for supplying a fluid. The life determining method includes:

- a step of estimating a current of the brush motor based on a temperature of the fluid and a pressure of the fluid;
- a step of measuring an operation time of the brush motor at the estimated current; and
- a step of determining the life of the brush motor based on the estimated current and the measured operation time.

With the life determining device and the life determining method according to the present disclosure, it is possible to determine the life of the brush motor without providing the current sensor.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a block diagram showing ECU of the vehicle height adjustment system of

FIG. 1;

FIG. 3 illustrates an exemplary map of ECU of FIG. 2;

FIG. 4 is a diagram illustrating an exemplary operation history of ECU of FIG. 2;

DETAILED DESCRIPTION OF EMBODIMENTS

Hereinafter, an embodiment of the present disclosure will be described.

First, a configuration of a vehicle height adjustment system 100 to which an ECU 4 according to an embodiment of the present disclosure is applied will be described.

Figure 1:
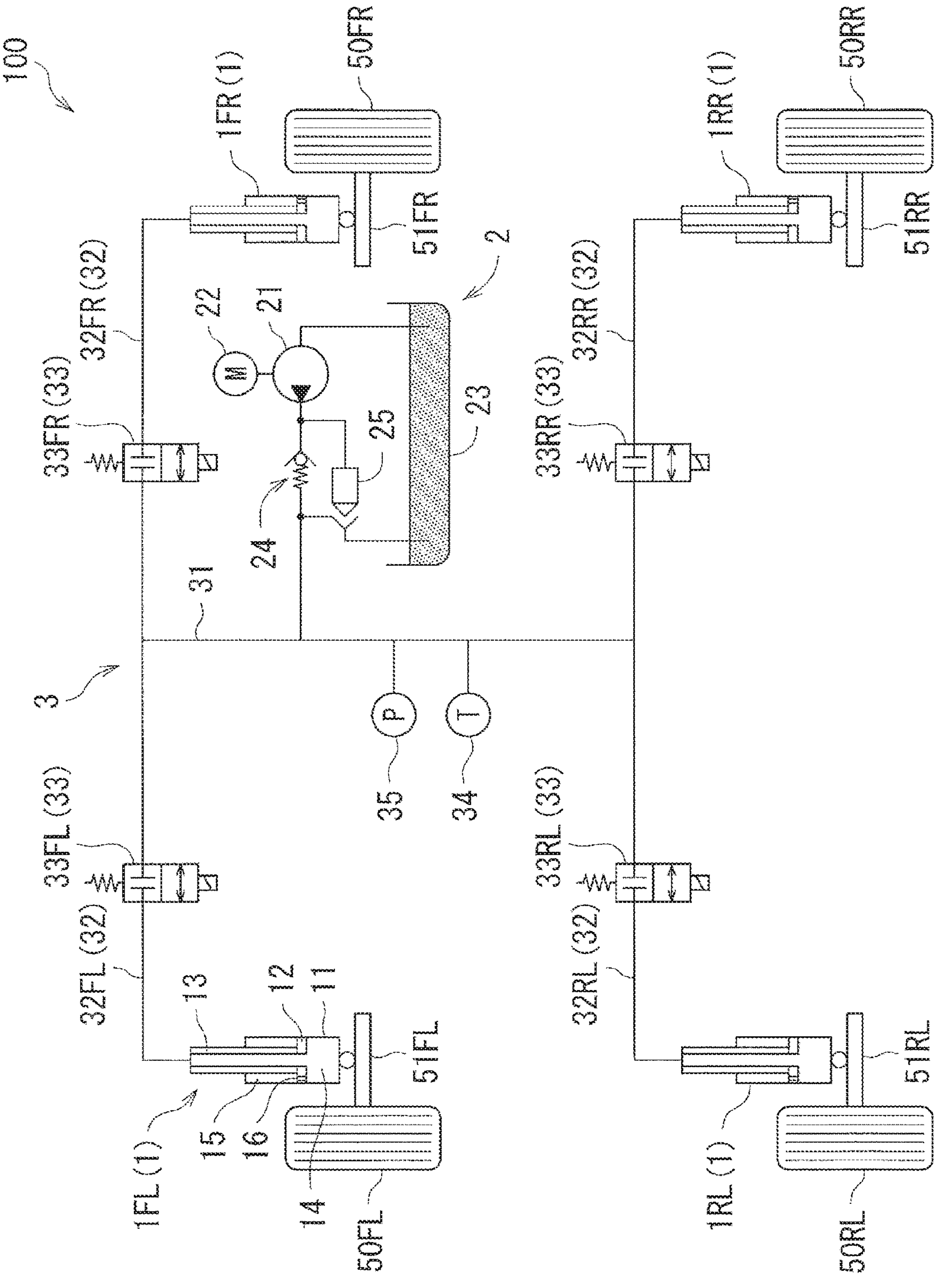
FIG. 1 is a schematic diagram illustrating a configuration of a vehicle height adjustment system according to the present embodiment.

The vehicle height adjustment system 100 is configured to adjust a height position of a vehicle body (not shown) with respect to a wheel in the vehicle. As shown in FIG. 1, the wheel includes a left front wheel 50FL, a right front wheel 50FR, a left rear wheel 50RL, and a right rear wheel 50RR. A rear wheel 50RR in which a rear wheel 50RL in which a front wheel 50FR in which the front wheel 50FL is rotatably held by the front wheel holding member 51FL is rotatably held by the front wheel holding member 51FR is rotatably held by the rear wheel holding member 51RL is rotatably held by the rear wheel holding member 51RR.

Figures 2, 3:
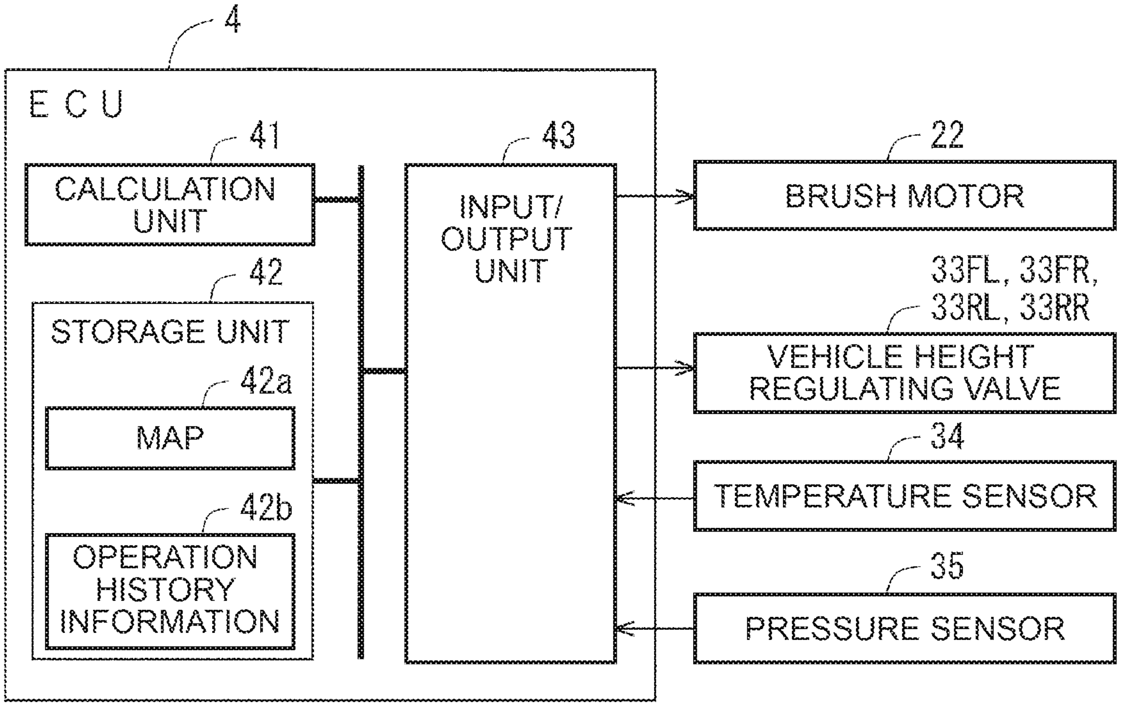

The vehicle height adjustment system 100 includes four hydraulic cylinders 1, a hydraulic oil supply/discharge device 2, a hydraulic circuit 3, and an ECU 4 (see FIG. 2). The four hydraulic cylinders 1 include a hydraulic cylinder 1FL, 1FR, 1RL and a 1RR. The hydraulic cylinder 1FL, 1FR, 1RL and 1RR are exemplary "actuators" of the present disclosure. Further, ECU 4 is an exemplary "life determining device" of the present disclosure.

The hydraulic cylinder 1FL is provided between the front wheel holding member 51FL and the vehicle body. The hydraulic cylinder 1FL functions as a shock absorber. The hydraulic cylinder 1FL is configured to be able to adjust the distance between the front wheel holding member 51FL and the vehicle body by expanding and contracting. A suspension spring (not shown) is provided between the front wheel holding member 51FL and the vehicle body in parallel with the hydraulic cylinder 1FL.

Specifically, the hydraulic cylinder 1FL includes a housing 11, a piston 12, and a piston rod 13. The housing 11 has an internal space in which the piston 12 is movably accommodated. A piston rod 13 is connected to the piston 12. The housings 11 are connected to the front wheel holding member 51FL. A piston rod 13 is connected to the vehicle body. An internal space of the housing 11 is partitioned by the piston 12, and oil chambers 14 and 15 are formed. A communication path 16 is formed in the piston 12. The oil chambers 14 and 15 are communicated with each other through the communication path 16. A throttle is provided in the communication path 16. Therefore, the hydraulic cylinder 1FL is configured to generate a damping force corresponding to a moving velocity of the piston 12 with respect to the housing 11.

The hydraulic cylinder 1FR is provided between the front wheel holding member 51FR and the vehicle body. The hydraulic cylinder 1RL is provided between the rear wheel holding member 51RL and the vehicle body. The hydraulic cylinder 1RR is provided between the rear wheel holding member 51RR and the vehicle body. Further configurations of the hydraulic cylinder 1FR, 1RL and 1RR are the same as those of the hydraulic cylinder 1FL described above.

The hydraulic oil supply/discharge device 2 is provided for supplying and discharging hydraulic oil to and from the four hydraulic cylinders 1 via the hydraulic circuit 3. The hydraulic oil supply/discharge device 2 includes an oil pump 21, a brush motor 22, a reservoir tank 23, a check valve 24, and a return valve 25. The oil pump 21 is an example of the "supply device" of the present disclosure, and the hydraulic oil is an example of the "fluid" of the present disclosure.

The hydraulic oil is stored in the reservoir tank 23. The oil pump 21 is provided to pump the hydraulic oil in the reservoir tank 23 and supply the hydraulic oil to a common passage 31, which will be described later, of the hydraulic circuit 3. The brush motor 22 is a power source of the oil pump 21 and is provided to operate the oil pump 21. The brush motor 22 is a motor that operates by a mechanical mechanism using a brush and a commutator. The check valve 24 and the return valve 25 are arranged in parallel on the discharge port side of the oil pump 21.

The check valve 24 is configured to allow the flow of the hydraulic oil from the oil pump 21 toward the common passage 31, and the check valve 24 is configured to prevent the flow of the hydraulic oil from the common passage 31 toward the oil pump 21. The return valve 25 is provided to switch between the supply of the hydraulic oil from the oil pump 21 to the common passage 31 and the discharge of the hydraulic oil from the common passage 31 to the reservoir tank 23. Specifically, when the oil pump 21 is stopped, the return valve 25 shuts off the discharge port side of the oil pump 21 and the common passage 31, and the common passage 31 communicates with the reservoir tank 23 side. On the other hand, when the oil pump 21 is operating, the return valve 25 shuts off the reservoir tank 23 side and the common passage 31, and the common passage 31 communicates with the discharge port side of the oil pump 21.

The hydraulic circuit 3 is provided between the four hydraulic cylinders 1 and the hydraulic oil supply/discharge device 2. The hydraulic circuit 3 includes a common passage 31, four individual passages 32, and four vehicle height regulating valves 33. The four individual passages 32 have individual passages 32FL, 32FR, 32RL and 32RR. The four vehicle height regulating valves 33 have a vehicle height regulating valve 33FL, 33FR, 33RL and a 33RR.

The common passage 31 is disposed between the hydraulic oil supply/discharge device 2 and the four individual passages 32. That is, the common passage 31 is connected to the hydraulic oil supply/discharge device 2, and is branched from the common passage 31 into four individual passages 32. A temperature sensor 34 and a pressure sensor 35 are provided in the common passage 31.

The individual passages 32FL are provided for connecting the hydraulic cylinder 1FL to the common passages 31. The individual passage 32FL is provided with a vehicle height regulating valve 33FL. The vehicle height regulating valve 33FL is, for example, a normally-closed solenoid valve, and is provided to communicate or shut off the hydraulic cylinder 1FL with the common passage 31. The vehicle height regulating valve 33FL is configured to be opened at the time of supplying and discharging hydraulic oil to and from the hydraulic cylinder 1FL.

The individual passages 32FR are provided for connecting the hydraulic cylinder 1FR to the common passages 31. The individual passage 32FR is provided with a vehicle height regulating valve 33FR. The vehicle height regulating valve 33FR is, for example, a normally-closed solenoid valve, and is provided to communicate or shut off the hydraulic cylinder 1FR with the common passage 31. The vehicle height regulating valve 33FR is configured to be opened at the time of supplying and discharging hydraulic oil to and from the hydraulic cylinder 1FR.

The individual passages 32RL are provided for connecting the hydraulic cylinder 1RL to the common passages 31. The individual passage 32RL is provided with a vehicle height regulating valve 33RL. The vehicle height regulating valve 33RL is, for example, a normally-closed solenoid valve, and is provided to communicate or shut off the hydraulic cylinder 1RL with the common passage 31. The vehicle height regulating valve 33RL is configured to be opened at the time of supplying and discharging hydraulic oil to and from the hydraulic cylinder 1RL.

The individual passages 32RR are provided for connecting the hydraulic cylinder 1RR to the common passages 31. The individual passage 32RR is provided with a vehicle height regulating valve 33RR. The vehicle height regulating valve 33RR is, for example, a normally-closed solenoid valve, and is provided to communicate or shut off the hydraulic cylinder 1RR with the common passage 31. The vehicle height regulating valve 33RR is configured to be opened at the time of supplying and discharging hydraulic oil to and from the hydraulic cylinder 1RR.

As illustrated in FIG. 2, ECU 4 includes a calculation unit 41, a storage unit 42, and an input/output unit 43. The storage unit 42 stores a program or the like for controlling the vehicle height adjustment system 100. The calculation unit 41 is configured to control the vehicle height adjustment system 100 by executing a program stored in the storage unit 42. A temperature sensor 34, a pressure sensor 35, a vehicle height sensor (not shown), a brush motor 22, four vehicle height regulating valves 33, and the like are connected to the input/output unit 43.

The temperature sensor 34 is provided to detect the temperature (oil temperature) of the hydraulic oil in the common passage 31. The pressure sensor 35 is provided to detect the pressure (hydraulic pressure) of the hydraulic oil in the common passage 31. The vehicle height sensor is provided to detect a distance between the wheel and the vehicle body. ECU 4 is configured to control the brush motor 22 and the four vehicle height regulating valves 33 based on inputs from a vehicle height sensor or the like.

Elevation of the Vehicle Height

Next, an example of the elevating operation of the vehicle height of the vehicle height adjustment system 100 will be described.

When the Vehicle Height Rises

When the vehicle height is increased, the brush motor 22 is driven by ECU 4 to operate the oil pump 21, and the four vehicle height regulating valves 33 are opened. Therefore, the hydraulic oil discharged from the oil pump 21 is supplied to the four hydraulic cylinders 1 via the hydraulic circuit 3. As a result, the four hydraulic cylinders 1 extend and the vehicle height increases. After that, when the vehicle height reaches the target value, the four vehicle height regulating valves 33 are closed by ECU 4, and the operation of the oil pump 21 is stopped.

During Vehicle Height Descent

When the vehicle height is lowered, the four vehicle height regulating valves 33 are opened by ECU 4 while the oil pump 21 is stopped. Therefore, the hydraulic oil of the four hydraulic cylinders 1 is returned to the reservoir tank 23 via the hydraulic circuit 3 and the return valve 25. As a result, the four hydraulic cylinders 1 contract and the vehicle height decreases. After that, when the vehicle height reaches the target value, the four vehicle height regulating valves 33 are closed by ECU 4.

Determining the Life of the Brush Motor

Here, when the brush motor 22 is operated, the brush slides and wears. Therefore, in the brush motor 22, the brush is easily deteriorated. Therefore, ECU 4 is configured to estimate the degree of degradation of the brush and determine the life of the brush motor 22.

ECU 4 is configured to estimate the current (motor current) of the brush motor 22 based on the detection result of the temperature sensor 34 and the detection result of the pressure sensor 35. ECU 4 is also configured to measure the operation time of the brush motor 22 at the estimated motor current. Further, ECU 4 is configured to determine the life of the brush motor 22 based on the estimated motor current and the operation times at that motor current. By executing the program stored in the storage unit 42 by the calculation unit 41, the "current estimating unit", "operation time measuring unit", and "life determining unit" of the present disclosure are realized.

Specifically, ECU 4 storage unit 42 stores map 42*a* and operation history information 42*b*. The map 42*a* is for deriving the motor current using the oil temperature and the hydraulic pressure as parameters. That is, ECU 4 is configured to estimate the motor current using the map 42*a*. Note that the map 42*a* is created in advance by experimentation, simulations, or the like.

In the map 42*a* illustrated in FIG. 3, the parameter of the oil temperature T is set in three stages, the parameter of the hydraulic pressure P is set in four stages, and the motor current MC of the twelve patterns is estimated. For example, when the oil temperature T is less than the threshold Tta and the hydraulic pressure P is less than the threshold Pta, the motor current MCaa is set.

In the map 42*a*, the motor current MC is set to decrease as the oil temperature T increases. Therefore, for example, the motor current MCab is smaller than the motor current MCaa, and the motor current MCac is smaller than the motor current MCab. In the map 42*a*, the motor current MC is set to increase as the hydraulic pressure P increases. Therefore, for example, the motor current MCba is larger than the motor current MCaa, the motor current MCca is larger than the motor current MCba, and the motor current MCda is larger than the motor current MCca. Therefore, in the map 42*a*, the motor current MCda is the largest and the motor current MCac is the smallest.

As shown in FIG. 4, in the operation history information 42*b*, the operation time OT of the brush motor 22 at the respective motor current MC is accumulated. For example, the operation history information 42*b* includes an operation time OTaa in the motor current MCaa. The operation time OT is integrated by ECU 4 when the brush motor 22 is driven.

ECU 4 is configured to calculate a current squared time product $I^2t$ using the operation time OT at the motor current MC accumulated in the operation history information 42*b*. The current squared time product $I^2t$ is calculated using the following equation (1).

[Mathematical formula 1)

$$I^2t = (MCaa)^2 \times OTaa + (MCab)^2 \times OTab + (MCac)^2 \times OTac + (MCba)^2 \times OTba + (MCbb)^2 \times OTbb + (MCbc)^2 \times OTbc + (MCca)^2 \times OTca + (MCcb)^2 \times OTcb + (MCcc)^2 \times OTcc + (MCda)^2 \times OTda + (MCdb)^2 \times OTdb + (MCdc)^2 \times OTdc \quad (1)$$

Further, ECU 4 is configured to determine that the life of the brush motor 22 has arrived when the current squared-time product $I^2t$ exceeds a threshold. The threshold value is a value set in advance based on an experiment, a simulation, or the like.

Operation History Accumulation Operation

Next, referring to FIG. 5, the operation of accumulating the operation history of the brush motor 22 by ECU 4 will be described.

Figure 5:
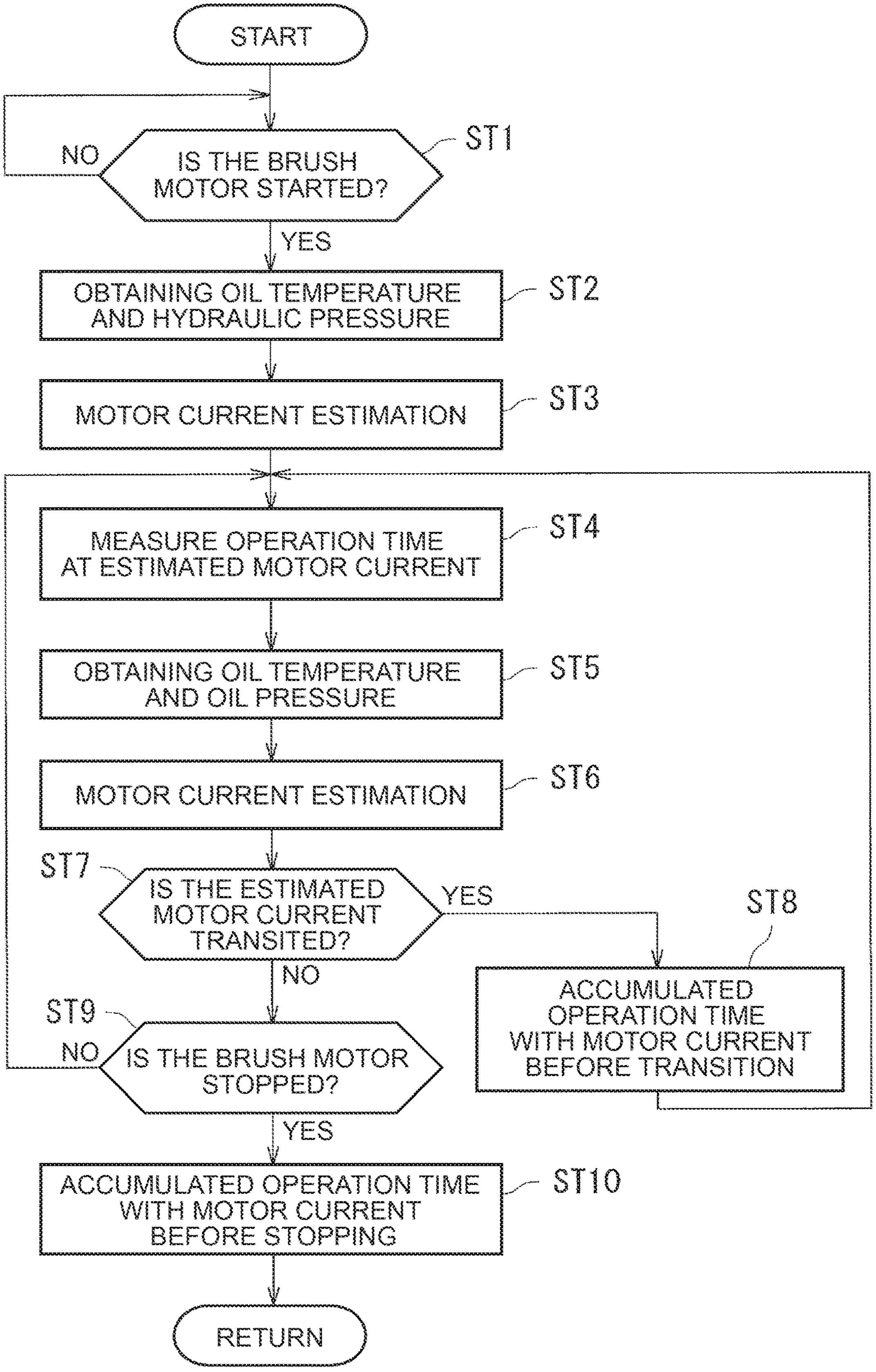
FIG. 5 is a flow chart for describing the operation of accumulating the operation history of the brush motor according to ECU of FIG. 2.

First, in ST1 of FIG. 5, whether or not the brush motor 22 has been started is determined by ECU 4. For example, the brush motor 22 is started at the start of the vehicle height raising operation. If ECU 4 determines that the brush motor 22 has been started, the process proceeds to ST2. On the other hand, when ECU 4 determines that the brush motor 22 has not been started, ST1 is repeated. That is, the process waits until the brush motor 22 is started.

Next, in ST2, the oil temperature and the hydraulic pressure are acquired by ECU 4 using the temperature sensor 34 and the pressure sensor 35. The oil temperature is the temperature of the hydraulic oil in the common passage 31, and the hydraulic pressure is the pressure of the hydraulic oil in the common passage 31. Then, in ST3, the motor current is estimated by ECU 4 using the map 42*a*. This estimation is based on the oil temperature and hydraulic pressure obtained in ST2.

Next, in ST4, ECU 4 measures the operation times at the estimated motor currents.

Next, in ST5, the oil temperature and the hydraulic pressure are acquired by ECU 4 using the temperature sensor 34 and the pressure sensor 35. Then, in ST6, the motor current is estimated by ECU 4 using the map 42*a*. This estimation is based on the oil temperature and hydraulic pressure obtained in ST5.

Next, in ST7, it is determined by ECU 4 whether the estimated motor current has transitioned. That is, it is determined by ECU 4 whether the motor current estimated by ST6 has changed from the motor current estimated previously. If ECU 4 determines that the motor current has transitioned, the process proceeds to ST8. On the other hand, if ECU 4 determines that the motor current has not transitioned, the process proceeds to ST9.

In ST8, ECU 4 accumulates operation times at the motor current prior to transitions. That is, the operation time measured by ST4 is integrated with the operation time of the corresponding motor current in the operation history information 42*b*. For example, when the motor current MCaa transitions to the motor current MCba and the motor current is operated for one second in the motor current MCaa prior to the transition, one second is added to the operation time OTaa of the motor current MCaa corresponding to the operation history information 42*b*. Thereafter, the process returns to ST4.

In ST9, whether or not the brush motor 22 is stopped is determined by ECU 4. For example, the brush motor 22 is stopped at the end of the vehicle height raising operation. If ECU 4 determines that the brush motor 22 has been stopped, the process proceeds to ST10. On the other hand, if ECU 4 determines that the brush motor 22 is not stopped, the process returns to ST4.

In ST10, ECU 4 accumulates operation times at motor current prior to shutdown. That is, the operation time measured by ST4 is integrated with the operation time of the corresponding motor current in the operation history information 42*b*. For example, when the brush motor 22 is operating at the motor current MCcb for two seconds prior to stopping, two seconds are added to the corresponding motor current MCcb operation time OTcb of the operation history information 42*b*. Processing then proceeds to return.

Life Determination

Next, referring to FIG. 6, a life determining operation of the brush motor 22 by ECU 4 will be described.

Figure 6:
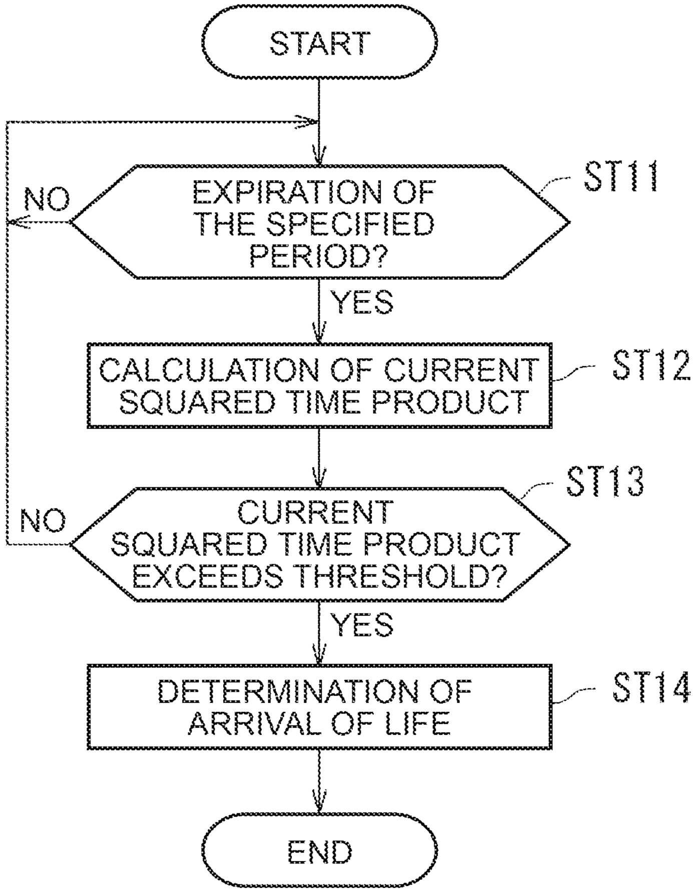
FIG. 6 is a flow chart for explaining a life determining operation of the brush motor according to ECU of FIG. 2.

First, in ST11 of FIG. 6, whether or not a predetermined period has elapsed is determined by ECU 4. This predetermined period is a preset period, and is, for example, one day. If ECU 4 determines that the predetermined time has elapsed, the process proceeds to ST12. On the other hand, when ECU 4 determines that the predetermined time has not elapsed, ST11 is repeated. That is, the process waits until the predetermined period elapses. That is, ST12 and ST13 described later are performed at predetermined intervals.

Next, in ST12, ECU 4 calculates the current squared-time product using the operation history information 42*b*. The current squared time product is calculated using equation (1) described above.

Next, in ST13, it is determined by ECU 4 whether the current squared-time product exceeds the thresholds. Then, if ECU 4 determines that the current squared-time product exceeds the threshold, the process proceeds to ST14. On the other hand, if ECU 4 determines that the current squared-time product does not exceed the thresholds, the process returns to ST11.

In ST14, it is determined by ECU 4 that the service life of the brush motor 22 has arrived. In this case, ECU 4 uses a notification device (not shown) to notify the user that the service life of the brush motor 22 has reached. Accordingly, it is possible to prompt the user to replace the brush motor 22 that has reached the end of its life.

Effects

In the present embodiment, as described above, the motor current is estimated based on the oil temperature and the hydraulic pressure. The operation time at the estimated motor current is measured. The lifetime of the brush motor 22 is determined based on the motor current and the operation time. As described above, the motor current is estimated based on the oil temperature and the hydraulic pressure, so that it is possible to determine the life of the brush motor 22 without providing a current sensor for measuring the motor current. That is, since the motor current is estimated by using the existing temperature sensor 34 and the pressure sensor 35 in the vehicle height adjustment system 100, it is not necessary to add the current sensor, so that an increase in the number of components can be suppressed. By determining the life of the brush motor 22, the brush motor 22 can be appropriately used up.

Further, in the present embodiment, the motor current can be appropriately estimated by estimating the motor current using the map 42*a*.

Further, in the present embodiment, the arrival of the lifetime can be appropriately determined by determining the arrival of the lifetime based on the current squared time product.

Other Embodiments

The embodiment disclosed herein is illustrative in all respects and should not be construed as restrictive. The technical scope of the disclosure should not be interpreted only on the basis of the above embodiment but is defined based on description of the scope of claims. All modifications that are made without departing from the scope of the claims fall within the technical scope of the disclosure.

For example, in the above embodiment, an example in which the hydraulic cylinder 1 is provided has been described. The present disclosure is not limited thereto, and an air cylinder may be provided instead of the hydraulic cylinder.

In the above embodiment, the lifetime determination operation (see FIG. 6) is executed by ECU 4. The present disclosure is not limited to this, and the lifetime determination operation may be executed by the server device by ECU transmitting the operation history information to the server device (not shown).

Further, in the above embodiment, the parameter of the oil temperature of the map 42*a* is set in three stages, and the parameter of the hydraulic pressure of the map 42*a* is set in four stages. The number of stages of the oil temperature parameter of the map may be any number, and the number of stages of the hydraulic pressure parameter of the map may be any number. That is, although an example in which the motor current of the twelve patterns is estimated has been described, the number of patterns of the motor current estimated is not limited to this.

The present disclosure is applicable to a life determining device and a life determining method for determining a life of a brush motor that is a power source of a supply device that supplies a fluid.

What is claimed is:

1. A life determining device configured to determine an end of life of a brush motor that is a power source of a supply device that supplies a fluid to a hydraulic cylinder of a vehicle, the vehicle including a temperature sensor configured to detect a temperature of the fluid and a pressure sensor configured to detect a pressure of the fluid, the life determining device comprising an electronic control unit (ECU) including a processor and a memory storing (i) a map for deriving a motor current value of the brush motor using the temperature and the pressure as parameters, and (ii) operation history information in which an operation time of the brush motor at each motor current value of the map is accumulated, wherein the processor is configured to:

control the brush motor to start the brush motor;

acquire the temperature from the temperature sensor and acquire the pressure from the pressure sensor in response to the brush motor being started;

estimate the motor current value based on the temperature and the pressure using the map;

measure the operation time of the brush motor at the estimated motor current value; and control the brush motor to stop the brush motor;

accumulate the operation time at the estimated motor current value measured prior to stopping the brush motor in the operation history information, in response to the brush motor being stopped;

calculate a current squared time product by using the operation time at each motor current value accumulated in the operation history information, the current squared time product including a product of (i) a square of the motor current value and (ii) the operation time;

determine whether a value of the current squared time product exceeds a threshold value; and control the vehicle to notify a user of the vehicle that the brush motor has reached the end of life to prompt replacement of the brush motor in a case where a determination is made that the value of the current squared time product exceeds the threshold value.

2. The life determining device according to claim 1, wherein:

the motor current value in the map is set to decrease as the temperature in the map increases; and the motor current value in the map is set to increase as the pressure in the map increases.

3. The life determining device according to claim 1, wherein the supply device is configured to supply the fluid to the hydraulic cylinder of a vehicle height adjustment system mounted on the vehicle.

4. The life determining device according to claim 1, wherein:

the ECU further includes an input/output unit; and the input/output unit is connected to the temperature sensor, the pressure sensor, and the brush motor.

5. The life determining device according to claim 1, wherein the ECU is further connected to a vehicle height sensor mounted on the vehicle, the vehicle height sensor being configured to detect a distance between a wheel and a vehicle body of the vehicle.

6. The life determining device according to claim 5, wherein the ECU is configured to control the brush motor based on an input from the vehicle height sensor.

* * * * *